US009617967B2

(12) United States Patent
Martin et al.

(10) Patent No.: US 9,617,967 B2
(45) Date of Patent: Apr. 11, 2017

(54) METHOD AND SYSTEM FOR LASER IGNITION CONTROL

(71) Applicant: Ford Global Technologies, LLC, Dearborn, MI (US)

(72) Inventors: Douglas Raymond Martin, Canton, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/931,249

(22) Filed: Jun. 28, 2013

(65) Prior Publication Data

US 2015/0005997 A1 Jan. 1, 2015

(51) Int. Cl.

| | |
|---|---|
| ***G06F 19/00*** | (2011.01) |
| ***G06G 7/70*** | (2006.01) |
| ***F02P 23/04*** | (2006.01) |
| ***F02P 17/12*** | (2006.01) |
| *F02D 35/02* | (2006.01) |

(52) U.S. Cl.

CPC ............... *F02P 23/04* (2013.01); *F02P 17/12* (2013.01); *F02D 35/022* (2013.01); *F02D 35/026* (2013.01); *Y10S 903/905* (2013.01)

(58) Field of Classification Search

USPC ...................................................... 123/143 B

See application file for complete search history.

(56) References Cited

U.S. PATENT DOCUMENTS

| | | | | |
|---|---|---|---|---|
| 4,852,529 | A | 8/1989 | Vowles | |
| 4,915,086 | A | 4/1990 | Ciliberto et al. | |
| 5,876,195 | A * | 3/1999 | Early | 431/11 |
| 6,796,278 | B2 * | 9/2004 | Ryan, III | 123/143 B |
| 7,114,858 | B2 * | 10/2006 | Gupta et al. | 385/88 |
| 7,770,552 | B2 * | 8/2010 | Schultz | 123/143 B |
| 7,806,094 | B2 * | 10/2010 | Gruber | 123/143 B |
| 8,297,248 | B2 | 10/2012 | Martin et al. | |
| 2006/0032471 | A1 * | 2/2006 | Yalin et al. | 123/143 B |
| 2006/0037572 | A1 * | 2/2006 | Yalin et al. | 123/143 B |
| 2008/0196690 | A1 * | 8/2008 | Hotta et al. | 123/274 |
| 2010/0186368 | A1 | 7/2010 | Ikeda | |
| 2012/0088197 | A1 * | 4/2012 | Byrd et al. | 431/2 |
| 2012/0131926 | A1 * | 5/2012 | Kopecek et al. | 60/776 |
| 2012/0131927 | A1 * | 5/2012 | Denis et al. | 60/776 |
| 2012/0325190 | A1 | 12/2012 | Brandes et al. | |
| 2013/0098331 | A1 | 4/2013 | Woerner et al. | |
| 2013/0186362 | A1 * | 7/2013 | Kanehara et al. | 123/143 B |

(Continued)

OTHER PUBLICATIONS

Martin, Douglas Raymond et al., "Laser Ignition and Misfire Monitor," U.S. Appl. No. 13/677,641, filed Nov. 15, 2012, 30 pages.

(Continued)

*Primary Examiner* — Bhavesh V Amin

(74) *Attorney, Agent, or Firm* — Julia Voutyras; McCoy Russell LLP

(57) ABSTRACT

Methods and systems are provided for closed-loop adjusting a laser intensity of a laser ignition device of a hybrid vehicle. The laser intensity applied over consecutive laser ignition events is decreased until a flame quality is degraded for a threshold number of cylinder combustion events. The laser intensity is then increased to improve flame quality and the closed-loop adjustment is reiterated.

18 Claims, 3 Drawing Sheets

(56) References Cited

U.S. PATENT DOCUMENTS

2014/0316621 A1* 10/2014 Martin et al. .................. 701/22

OTHER PUBLICATIONS

Martin, Douglas Raymond et al., "Engine With Laser Ignition and Measurement," U.S. Appl. No. 13/689,601, filed Nov. 29, 2012, 44 pages.
Martin, Douglas Raymond et al., "Engine With Laser Ignition and Measurement," U.S. Appl. No. 13/689,578, filed Nov. 29, 2012, 54 pages.
Martin, Douglas Raymond et al., "Laser Ignition System Based Diagnostics," U.S. Appl. No. 13/865,088, filed Apr. 17, 2013, 41 pages.
Martin, Douglas Raymond et al., "Laser Ignition System Based Diagnostics," U.S. Appl. No. 13/865,089, filed Apr. 17, 2013, 40 pages.
Martin, Douglas Raymond et al., "Laser Ignition Safety Interlock System and Method," U.S. Appl. No. 13/870,327, filed Apr. 25, 2013.

* cited by examiner

METHOD AND SYSTEM FOR LASER IGNITION CONTROL

FIELD

The present application relates to methods and systems for improving vehicle fuel economy by reducing laser energy usage of an engine laser ignition system.

BACKGROUND AND SUMMARY

Engine systems on vehicles, such as hybrid electric vehicles (HEV) and vehicles configured for idle-stop operations, may be configured with a laser ignition system. In addition to initiating cylinder combustion, the laser ignition system may be used during engine starting to accurately determine the position of a piston in each cylinder, enabling an appropriate cylinder to be selected for a first combustion event. As such, this improves the engine's ability to restart. The laser ignition device may be continually operated at high energy intensity to ensure that each combustion event has good combustion of the air-fuel mixture. However, since the laser ignition system uses energy from a vehicle system battery, frequent firing of the laser can deplete the battery. In hybrid vehicles, this can adversely affect vehicle fuel economy.

One example approach for improving fuel economy, when using a laser ignition system, is shown by Woerner et al. in US 2013/0098331. Therein, optimum burn-through of a cylinder air-fuel mixture is achieved by irradiating an ignition location inside a pre-combustion chamber with a plurality of laser ignition pulses temporally offset from one another. This allows a flame core generated in the pre-combustion chamber to be advantageously used to ignite the air-fuel mixture of the pre-combustion chamber as well as the main combustion chamber, thereby reducing overall laser ignition usage.

However, the inventors herein have recognized potential issues with such an approach. As one example, the approach may not be applicable in engine systems where each combustion chamber is not coupled to a corresponding pre-combustion chamber. As another example, if the flame core in the pre-combustion chamber is not generated correctly, in addition to the laser energy expended in generating the pre-combustion chamber flame core, further laser energy may need to be expended to generate a combustion chamber flame core. As such, this may increase battery charge consumption and degrade fuel economy.

In one example, some of the above issues may be addressed by an engine method comprising, dynamically adjusting a laser intensity of an engine laser ignition device during a cylinder ignition event based on a monitored cylinder flame quality. In this way, the laser intensity of the laser ignition system can be reduced until flame quality is affected to improve battery consumption.

For example, an engine in a hybrid electric vehicle may be configured with a laser ignition system including a battery-operated laser ignition device for igniting an air-fuel mixture and a photodetector for monitoring a flame quality inside each cylinder. Over a drive cycle, the laser intensity of the laser ignition device may be reduced (e.g, step-wise) over each ignition event while the photodetector is used to monitor the flame quality at each corresponding cylinder combustion event. The step-wise reduction may be based on, for example, engine load, cylinder head temperature, and combustion air-fuel ratio. The photodetector may include, for example, an infrared sensor and/or CCD camera for inferring a flame quality based on the peak in-cylinder temperature achieved during cylinder combustion following each ignition event. If the peak in-cylinder temperature achieved is lower than a threshold, it may be determined that good combustion did not occur (e.g. insufficient combustion occurred). In response to a threshold number of consecutive degraded flame events (e.g., 1-2 consecutive degraded flame events), it may be inferred that the laser energy is too low for combustion and the intensity of the laser ignition device may be increased to improve the combustion. Then, the reduction of laser intensity may be reiterated, for example, with a smaller drop in laser intensity at each ignition event. This allows for optimal laser energy usage.

In this way, laser ignition intensity may be dynamically adjusted over a vehicle drive cycle to reduce battery consumption. By reducing the laser ignition intensity as much as possible without affecting flame quality, laser energy consumption is reduced. By using a closed-loop adjustment of laser intensity based on flame quality, rather than an open-loop adjustment that over-compensates laser energy to always guarantee high flame quality, significant laser energy wastegate is reduced. As such, this reduces battery consumption and improves fuel economy in a hybrid vehicle system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
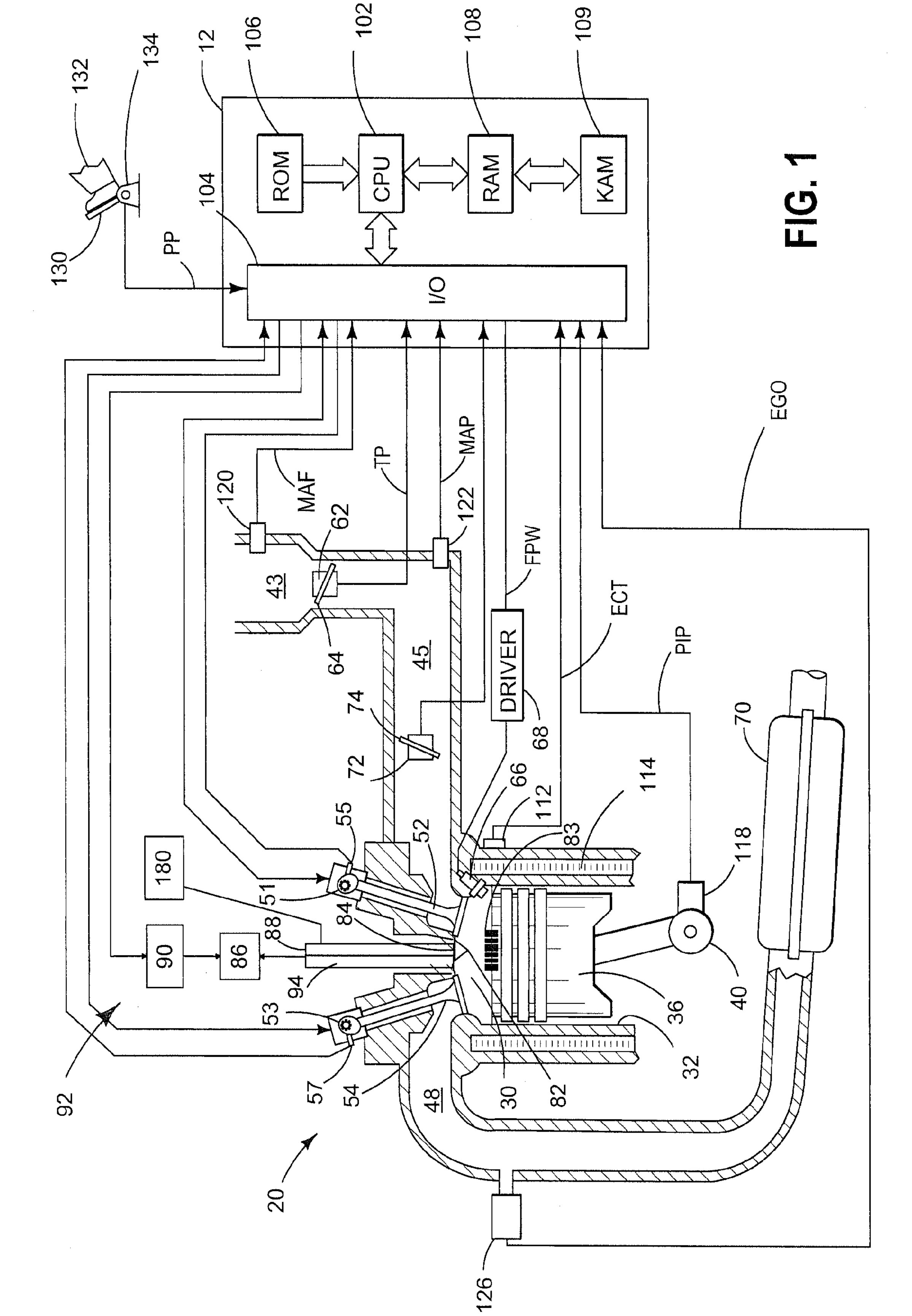
FIG. 1 shows a schematic diagram of an example internal combustion engine configured with a laser ignition system.

Methods and systems are provided for adjusting the laser energy of a laser ignition device in an engine system configured with a laser ignition system, such as the engine system of FIG. 1. A controller may be configured to perform a control routine, such as the routine of FIG. 2, to feedback adjust the laser energy used during consecutive ignition events based on a cylinder combustion flame quality monitored by a photodetector coupled to the laser ignition device. The laser energy used may be gradually reduced until the flame quality degrades following which the laser energy may be increased. FIG. 3 illustrates an example adjusting of a laser ignition device intensity to reduce battery consumption.

Referring to FIG. 1, the figure shows a schematic diagram of an example cylinder of multi-cylinder internal combustion engine 20. Engine 20 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion cylinder 30 of engine 20 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Combustion cylinder 30 may receive intake air from intake manifold 45 via intake passage 43 and may exhaust combustion gases via exhaust passage 48. Intake manifold 45 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. To enable detection of cam position, cam actuation systems 51 and 53 should have toothed wheels. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion cylinder 30 for injecting fuel directly therein in proportion to the pulse width of signal FPW received from controller 12 via electronic driver 68. In this manner, fuel injector 66 provides what is known as direct injection of fuel into combustion cylinder 30. The fuel injector may be mounted on the side of the combustion cylinder or in the top of the combustion cylinder, for example. Fuel may be delivered to fuel injector 66 by a fuel delivery system (not shown) including a fuel tank, a fuel pump, and a fuel rail. In some embodiments, combustion cylinder 30 may alternatively or additionally include a fuel injector arranged in intake passage 43 in a configuration that provides what is known as port injection of fuel into the intake port upstream of combustion cylinder 30.

Intake passage 43 may include a charge motion control valve (CMCV) 74 and a CMCV plate 72 and may also include a throttle 62 having a throttle plate 64. In this particular example, the position of throttle plate 64 may be varied by controller 12 via a signal provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. Intake passage 43 may include a mass air flow sensor 120 and a manifold air pressure sensor 122 for providing respective signals MAF and MAP to controller 12.

Exhaust gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The exhaust system may include light-off catalysts and underbody catalysts, as well as exhaust manifold, upstream and/or downstream air/fuel ratio sensors. Catalytic converter 70 can include multiple catalyst bricks, in one example. In another example, multiple emission control devices, each with multiple bricks, can be used. Catalytic converter 70 can be a three-way type catalyst in one example.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 109, and a data bus. The controller 12 may receive various signals and information from sensors coupled to engine 20, in addition to those signals previously discussed, including measurement of inducted mass air flow (MAF) from mass air flow sensor 120; engine coolant temperature (ECT) from temperature sensor 112 coupled to cooling sleeve 114; in some examples, a profile ignition pickup signal (PIP) from Hall effect sensor 118 (or other type) coupled to crankshaft 40 may be optionally included; throttle position (TP) from a throttle position sensor; and absolute manifold pressure signal, MAP, from sensor 122. The Hall effect sensor 118 may optionally be included in engine 20 since it functions in a capacity similar to the engine laser system described herein. Storage medium read-only memory 106 can be programmed with computer readable data representing instructions executable by processor 102 for performing the methods described below as well as variations thereof.

Engine 20 further includes a laser ignition system 92. Laser ignition system 92 includes a laser exciter 88 and a laser control unit (LCU) 90. LCU 90 causes laser exciter 88 to generate laser energy. Laser ignition system 92 may be battery-operated in that laser exciter 88 may draw electrical energy from battery 180 to generate the laser energy for an ignition event. In the depicted example, engine 20 may be configured in a hybrid electric vehicle that uses motor torque from battery 180 to propel the vehicle during some conditions and engine torque from engine 20 to propel the vehicle during other conditions. LCU 90 may receive operational instructions from controller 12. As elaborated below, this may include receiving instructions regarding a current to draw to from battery 180 to vary the energy of a laser pulse delivered by exciter 88. Laser exciter 88 includes a laser oscillating portion 86 and a light converging portion 84. The light converging portion 84 converges laser light generated by the laser oscillating portion 86 on a laser focal point 82 of combustion cylinder 30.

A photodetector 94 may be located in the top of cylinder 30 as part of the laser and may receive return pulses from the top surface of piston 36. Photodetector 94 may include one or more of a sensor, a camera, and a lens. In one example, the camera is a charge coupled device (CCD) configured to detect and read laser pulses emitted by LCU 90. For example, when the LCU emits laser pulses in an infra-red frequency range, the CCD camera may operate and receive the pulses in the infra-red frequency range. In such an embodiment, the camera may also be referred to as an infrared camera. In other embodiments, the camera may be a full-spectrum CCD camera that is capable of operating in a visual spectrum as well as the infra-red spectrum.

The camera may include a lens for focusing the detected laser pulses. In one example, the lens is a fish-eye lens. After laser emission from LCU 90, the laser sweeps within the interior region of cylinder 30 at laser focal point 82. As such, following operation of the laser ignition device, due to ignition of an air-fuel mixture in the cylinder, a cylinder combustion event may occur and a cylinder temperature may rise. Thus, light energy that is reflected off of piston 36 and heat generated in the cylinder may be detected by the infra-red camera in photodetector 94. In this way, the photodetector may be used to provide information regarding the quality of combustion in the cylinder. For example, the photodetector may provide information regarding the flame front, the flame quality and other combustion parameters.

In another example, the photodetector may include an infra-red sensor. The output of the photodetector in the infra-red spectrum may be used to estimate and monitor a flame quality in the cylinder. Specifically, following a combustion event, a peak in-cylinder temperature achieved may be estimated or inferred based on the output of the photodetector in the infra-red spectrum. If the temperature achieved is sufficiently high (e.g., higher than a threshold temperature), good cylinder combustion and delivery of sufficient laser ignition energy during the completed combustion/ignition event may be determined. In comparison, if the temperature achieved is not sufficiently high (e.g., lower than the threshold temperature), insufficient or incomplete combustion and delivery of insufficient laser ignition energy during the completed combustion/ignition event may be determined.

It will be appreciated that in still further embodiments, the flame quality may be monitored by comparing a cylinder temperature profile estimated by the photodetector in the infra-red spectrum to an expected cylinder temperature profile. The expected in-cylinder temperature profile may reflect heat generated in the cylinder and/or released from the cylinder over the course of a cylinder combustion event. For example, the cylinder temperature may be lower during an intake stroke when fresh intake air is received in the cylinder. Then, during a compression stroke, as an air-fuel mixture is compressed, a slight increase in temperature may be observed. Following the laser ignition event, during a compression stroke, ignition of the compressed air-fuel mixture may lead to combustion and a sudden increase in cylinder temperature. Finally, during an exhaust stroke, as the products of combustion are released from the cylinder, a cylinder temperature may fall. Thus, if combustion occurs in the cylinder as expected, a cylinder temperature profile with a peak at or around the compression stroke, at a threshold time since the laser ignition event, may be observed. As a result, the expected combustion profile may include an in-cylinder peak temperature that is higher than a threshold temperature and/or a peak temperature that occurs at a timing that is after a threshold duration since the laser ignition event. In the event of degraded combustion (e.g., a misfire event), an amount of heat generated in the cylinder may be substantially lower. Thus, the peak in-cylinder temperature may be lower than the threshold temperature. Further, a timing of the peak temperature in the temperature profile may lie outside of (e.g., later than) the threshold duration since the operation of the laser ignition device. Based on the discrepancy, degraded flame quality may be determined. As elaborated herein, responsive to the degraded flame quality, a laser intensity of the laser ignition system may be adjusted.

Laser system 92 is configured to operate in more than one capacity. For example, during combusting conditions, laser energy may be utilized for igniting an air/fuel mixture during a power stroke of the engine, including during engine cranking, engine warm-up operation, and warmed-up engine operation. Fuel injected by fuel injector 66 may form an air/fuel mixture during at least a portion of an intake stroke, where igniting of the air/fuel mixture with laser energy generated by laser exciter 88 commences combustion of the otherwise non-combustible air/fuel mixture and drives piston 36 downward. As another example, during non-combusting conditions, the laser energy may be used to identify the position of a piston of the cylinder, and thereby infer an engine position. Accurate engine position determination may be used during an engine start or restart to select a cylinder in which a first combustion event is initiated. During the determination of piston position, the laser device may sweep laser pulses with low energy intensity. For example, the laser may be frequency-modulated with a repetitive linear frequency ramp to determine the position of one or more pistons in an engine. Photodetector 94 may detect the light energy that is reflected off of the piston. An engine controller may determine the position of the piston in the cylinder based on a time difference between emission of the laser pulse and detection of the light reflected off the piston by the photodetector.

LCU 90 may direct laser exciter 88 to focus laser energy at different locations and at different power levels depending on operating conditions. For example, during combusting conditions, the laser energy may be focused at a first location away from cylinder wall 32 within the interior region of cylinder 30 in order to ignite an air/fuel mixture. In one embodiment, the first location may be near top dead center (TDC) of a power stroke. Further, the laser pulses used in this ignition mode to initiate cylinder combustion may be of a relatively higher power level. Further still, LCU 90 may direct laser exciter 88 to generate a first plurality of laser pulses directed to the first location, and the first combustion from rest may receive laser energy from laser exciter 88 that is greater than laser energy delivered to the first location for later combustions. In comparison, during non-combusting conditions, the laser energy may be focused at a top of the piston surface. The laser device may sweep laser pulses with low energy intensity through the cylinder at a high frequency. For example, the laser may be frequency-modulated with a repetitive linear frequency ramp. The laser pulses used when operating in piston determination mode may be of a lower power level than the laser pulses used when operating in the ignition mode.

As elaborated below, controller 12 controls LCU 90 and has non-transitory computer readable storage medium including code to adjust the intensity of laser energy delivery based on, for example, monitored flame quality, engine load, cylinder head temperature, exhaust air-fuel ratio and battery state of charge. In addition, a location of delivering the laser energy may also be varied. Controller 12 may also incorporate additional or alternative sensors for determining the operational mode of engine 20, including additional temperature sensors, pressure sensors, torque sensors as well as sensors that detect engine rotational speed, air amount and fuel injection quantity.

As described above, FIG. 1 shows only one cylinder of a multi-cylinder engine, and each cylinder may similarly include its own set of intake/exhaust valves, fuel injector, laser ignition system, etc.

As discussed above, during combustion conditions, the laser system may be operated in a higher power mode so as to generate sufficient laser energy to ignite and combust an air-fuel mixture in the cylinders. Energy may be drawn from the system battery 180 to operate the laser. The inventors have recognized that, typically, the laser ignition system is operated in the higher power level during combustion conditions to ensure sufficient laser energy for guaranteed cylinder combustion. However, if the laser ignition device is continually operated in the higher power mode, at the elevated energy level or intensity, battery energy may be drawn at a high rate. This may adversely affecting the fuel economy of the hybrid vehicle. In particular, based on cylinder operating conditions, and variations in engine load, the laser energy required to provide sufficient combustion of a cylinder air-fuel mixture may vary and may frequently be lower than the elevated (e.g., maximal) level. During those conditions, the use of higher laser intensity may be wasteful.

Figure 2:
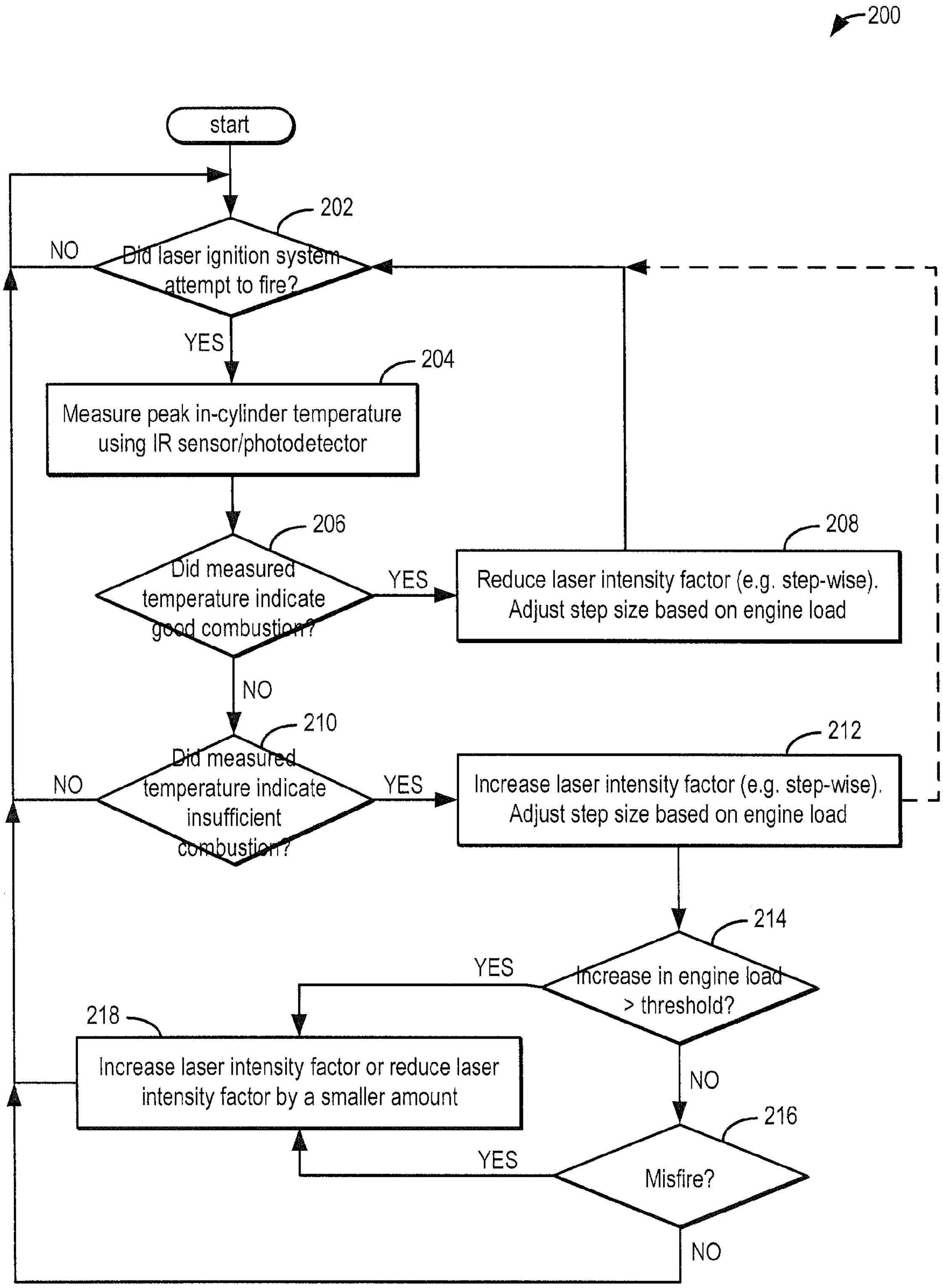
FIG. 2 shows a high level flow chart of a method for modulating the intensity of a cylinder laser ignition device based on flame quality.
Figure 3:
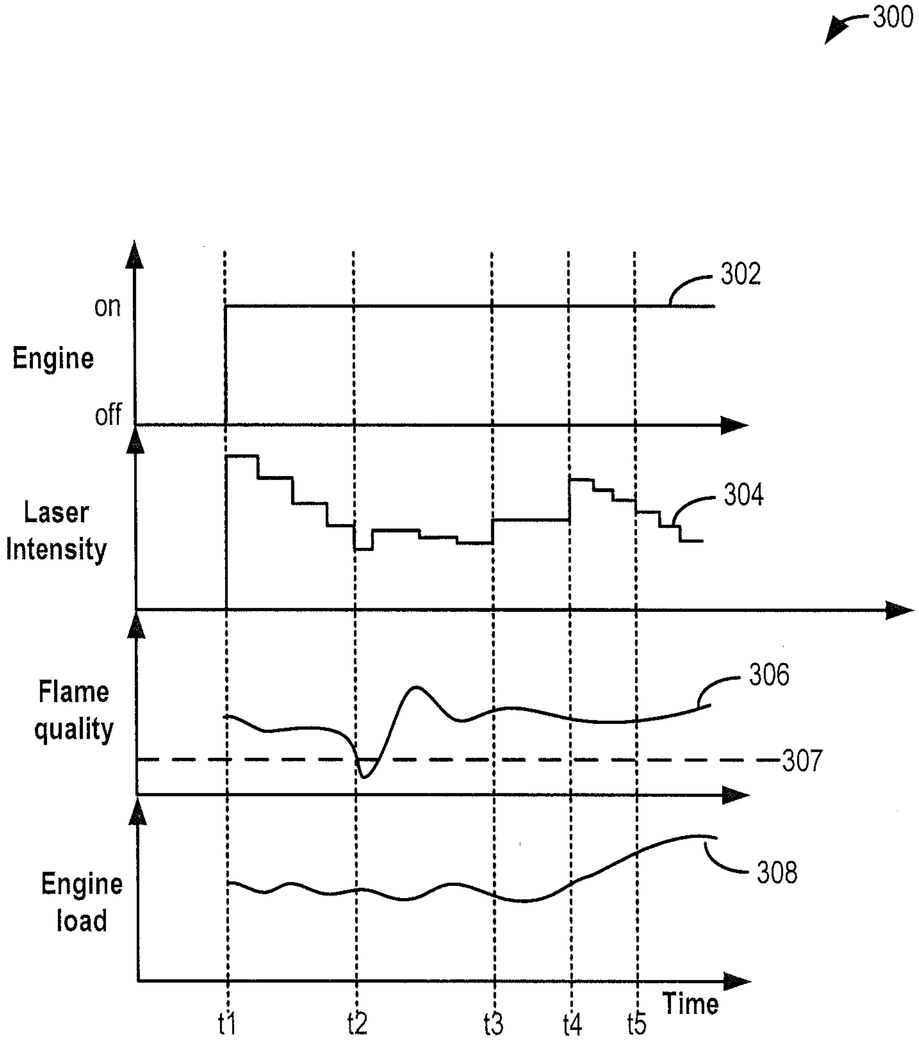
FIG. 3 shows an example closed-loop adjustment to the laser energy of a laser ignition device, according to the present disclosure.

As elaborated with reference to FIG. 2, during combustion conditions, the controller may decrease (e.g., continually or step-wise) the laser intensity over consecutive ignition events. The intensity may be decreased by decreasing the current drawn by the laser ignition system from battery 180 by a first factor that is based on engine load conditions as well as one or more of a battery state of charge, a cylinder head temperature, and a cylinder combustion air-fuel ratio. For example, as the cylinder had temperature decreases, the laser intensity used may be increased (that is, the first factor may be decreased). As another example, as the combustion air-fuel ratio becomes leaner than stoichiometry, the laser intensity used may be increased (with a smaller first factor being applied). The cylinder combustion event following the ignition event may be monitored by the photo-detector. If the flame quality is degraded (e.g., less than a threshold), it may be determined that the laser energy was not sufficient for efficient combustion. Accordingly, the controller may increase the laser energy level, for example, by increasing the current drawn by the laser ignition system from the battery by a second factor. The second factor may be smaller than the first factor and may also depend on engine load. The controller may then resume reducing the laser energy with smaller sized steps (e.g., with a smaller factor). In this way, the controller may dynamically and continually adjust the laser energy in a closed-loop fashion. This allows laser usage to be significantly reduced, improving battery consumption and vehicle fuel economy.

Now turning to FIG. 2, a routine 200 is shown for dynamically adjusting a laser intensity of an engine laser ignition device during a cylinder ignition event based on a monitored cylinder flame quality. The closed-loop control approach allows battery usage for ignition to be reduced, providing fuel economy benefits in a hybrid electric vehicle.

At 202, it may be determined if the laser ignition system attempted to fire. That is, it may be determined if a laser ignition event occurred. As such, during the laser ignition event, current may be drawn by the laser ignition system from a vehicle battery for generating laser energy for the ignition event.

Next, at 204, a peak in-cylinder temperature for a cylinder combustion event corresponding to the laser ignition event may be estimated and/or inferred. For example, the peak in-cylinder temperature following each ignition event may be inferred based on an output of a photodetector, operating in an infra-red spectrum, the photodetector coupled to the laser ignition system. The photodetector may include one or more of an infrared sensor, a CCD camera, and a spectral sensor operating in the infra-red region. As such, the sensor or photodetector lens may be cleaned prior to every combustion event by part of the fuel injector spray that sprays fuel directly (that is, via direct injection) into the cylinder. During the combustion event following the ignition event, heat is generated which produces infra-red light that is sensed by the photodetector. Based on the output of the photodetector, a cylinder flame quality (and other cylinder combustion parameters) for a combustion event resulting from the laser ignition event may be monitored.

At 206, it may be determined if the measured or inferred in-cylinder peak temperature is indicative of good cylinder combustion. For example, it may be determined if the temperature is higher than a threshold. Optionally, it may also be determined if a timing of the peak temperature is at a time corresponding to a compression stroke of the cylinder. If yes, then at 208, it may be determined that the monitored flame quality of the combustion event resulting from the preceding laser ignition event (at 202) is good and not degraded. In response to the flame quality not being degraded, and to optimize the use of laser energy, also at 208, the controller may decrease the laser intensity. In one example, decreasing the laser intensity includes step-wise decreasing the laser intensity over multiple ignition events (e.g., each subsequent ignition event) with a first factor based at least on engine load. This is because the ignition energy required for sufficient combustion in a cylinder varies with engine parameters such as engine load. As an example, as the engine load increases, the first factor may be decreased since higher engine load conditions typically require more ignition energy for good combustion. The first factor may be further based on one or more of a cylinder head temperature, combustion air-fuel ratio, and battery state of charge. By adjusting the first factor, a size of the step used in the step-wise reduction of laser intensity can be varied. In particular, a higher laser intensity may be applied at colder cylinder head temperatures. Likewise, a higher laser intensity may be applied during leaner cylinder operation. In alternate examples, the laser intensity may be gradually decreased and a rate of the gradual decrease may be adjusted based on one or more of the cylinder head temperature, the combustion air-fuel ratio and the battery state of charge. Further still, the laser intensity may be reduced and then maintained at the reduced level for a number of ignition events, then further reduced and then maintained at the further reduced level for a number of ignition events, and so on.

From 208, the routine returns to 202 to resume reconfirming ignition and good combustion before further reducing the laser intensity. In this way, following a laser ignition event of the engine, the controller may reduce a laser intensity at a plurality of subsequent laser ignition events of the engine until an inferred combustion flame quality reaches a threshold, the inferred combustion flame quality based on a photodetector coupled to the laser ignition system.

If good combustion is not confirmed at 206, at 210 it may be confirmed that the measured temperature (or monitored flame quality) indicated insufficient combustion. That is, it may be confirmed that the monitored flame quality for the combustion event was degraded. If not, the routine returns to 202 to resume reconfirming ignition and good combustion before further reducing the laser intensity. If degraded flame quality is confirmed, then at 212, the routine includes increasing the laser intensity. Increasing the laser intensity may include, for example, step-wise increasing the laser intensity over each ignition event with a second factor, different from the first factor used for decreasing the laser intensity. The second factor may also be based on engine load. For example, as the engine load increases, the second factor may be increased.

As used herein, decreasing the laser intensity includes decreasing a current of the laser ignition system during each ignition event, while increasing the laser intensity includes increasing the current of the laser ignition system during each ignition event. Specifically, during the decreasing, the current of the laser ignition device may be decreased by the first factor while during the increasing, the current of the laser ignition device may be increased by the second factor. Further, the first factor applied during the decreasing of laser intensity may be larger than the second factor applied during the increasing of laser intensity. In other words, the laser energy may be decreased by larger steps until combustion is degraded and then the intensity may be incremented by smaller steps. This allows the laser energy usage to be fine-tuned and optimized.

It will be appreciated that while the routine of FIG. 2 depicts, at each ignition event, decreasing the laser intensity and monitoring the cylinder flame quality, and then increasing the laser intensity at the next ignition event if the cylinder flame quality was determined to be degraded, it will be appreciated that in alternate examples, the laser intensity may be increased only after a threshold number of degraded combustion events have been confirmed. For example, the controller may, at each ignition event, decrease the laser intensity until the monitored cylinder flame quality is degraded over a threshold number of consecutive ignition events (such as 1-2 consecutive combustion events), and then increase the laser intensity.

As discussed above, it may be determined that the monitored flame quality is degraded based on an inferred peak in-cylinder temperature being lower than a threshold. However, it will be appreciated that while the routine of FIG. 2 assesses cylinder combustion and flame quality based on inferred in-cylinder peak temperatures and uses the assessment to vary the laser intensity for subsequent laser ignition events, in alternate embodiments, the inferred in-cylinder peak temperature may be used to assess one or more other, or additional, cylinder combustion parameters and that assessment may be used to vary the laser intensity for subsequent laser ignition events.

After the increasing, the routine may return to 202 to resume decreasing the laser intensity towards a minimal level. Optionally, after increasing the laser intensity, on the next iteration of the routine, the first factor may be reduced. In other words, a larger first factor may be applied when decreasing the laser intensity before degraded combustion is identified and before the laser intensity is compensatorily increased, while a smaller first factor may be applied when decreasing the laser intensity after degraded combustion is identified and after the laser intensity has been increased. For example, after increasing the laser intensity, the controller may reduce the first factor and repeat the decreasing of the laser intensity until the monitored cylinder flame quality is degraded with the reduced first factor.

From 212 the routine may also proceed to 214 to determine if there is any sudden change in engine load. As such, changes in engine load may lead to variations in the amount of ignition energy required for good cylinder combustion. Thus at 214, it may be determined if there is a sudden increase in engine load. This may include determining if the engine load is higher than a threshold, or if a rate of increase in the engine load is larger than a threshold (rate). If yes, then at 218, the routine includes, increasing the second factor and/or decreasing the first factor. That is, responsive to the rapid increase in engine load, which may require more ignition energy, the increasing of laser intensity (as at 212) is done at a higher rate and with larger steps so that more ignition energy can be provided at the higher load condition. Alternatively, the decreasing of laser intensity (as at 208) is done at a lower rate and with smaller steps so that more ignition energy is available at the higher load condition. In a further example, responsive to the sudden increase in engine load, the controller may resume operating the laser ignition system at the maximal ignition energy level (e,g., for a number of combustion events) to ensure sufficient combustion at the high load conditions. The decreasing may then be resumed when the engine load has decreased.

If there is no sudden increase in engine load, at 216, the routine determines if any abnormal combustion event has occurred. For example, it may be determined if there is an indication of severe misfire, or pre-ignition. As such, one or more of these abnormal combustion events may be induced by insufficient ignition energy. Thus, if abnormal combustion is confirmed, the routine returns to 218 to adjust the laser intensity to reduce further occurrence of abnormal combustion events. Specifically, the decreasing of laser intensity may be performed at a slower and smaller clip while the increasing of laser intensity may be performed at a faster and larger clip so as to provide more ignition energy for the subsequent ignition events. In a further example, responsive to the misfire, the controller may resume operating the laser ignition system at the maximal ignition energy level (e,g., for a number of combustion events) at least until the indication of abnormal combustion has decreased. If no misfire is determined, the routine may return to 202 and the decreasing of laser intensity to optimize laser energy usage may be reiterated.

In this way, reduction of laser intensity may be performed as an on-going dynamic process where the flame and combustion quality is monitored directly by the infra-red photodetector. By dynamically reducing the laser intensity, energy can be saved over a drive cycle.

In one example, a method for a hybrid vehicle engine including a laser ignition system comprises, following a laser ignition event of the engine, reducing a laser intensity at a plurality of subsequent laser ignition events of the engine until an inferred combustion flame quality reaches a threshold, the inferred combustion flame quality based on a photodetector coupled to the laser ignition system; and then increasing the laser intensity responsive to reaching the threshold. The photodetector may be configured for infrared detection. Inferring a combustion flame quality based on the photodetector may include estimating a peak in-cylinder temperature following each laser ignition event based on an output of the photodetector and inferring the combustion flame quality is degraded when the estimated peak in-cylinder temperature is lower than a threshold. Reducing the laser intensity may include reducing a current delivered to the laser ignition system from a battery by a first factor, the reduction factor based at least on engine load. The first factor may be further based on a state of charge of the battery, the first factor decreased as the battery state of charge decreases. The first factor may be further based on a cylinder head temperature and an exhaust air-fuel ratio, the first factor decreased as the cylinder head temperature falls or the air-fuel ratio falls becomes leaner than stoichiometry. Increasing the laser intensity may include increasing the current delivered to the laser ignition system by a second factor, the second factor based on the first factor and a rate of change in engine load. The second factor may be increased as a rate of rise in engine load increases. The first factor may be decreased and/or the second factor may be increased in response to one or more of an engine misfire event, and a pre-ignition event.

Now turning to FIG. 3, an example laser intensity adjustment over a vehicle drive cycle is shown. Map 300 depicts engine operation at plot 302, changes in laser ignition intensity at plot 304, cylinder flame quality at plot 306, and engine load at plot 308.

Prior to t1, the engine may be off. At t1, engine operation may be resumed (plot 302) and laser ignition may be required. Accordingly, at t1, a laser ignition device may be actuated on and the laser intensity may be initially set to a highest setting. The laser intensity of the engine laser ignition device may be dynamically adjusted from the highest setting over cylinder ignition events based on a monitored cylinder flame quality. Specifically, between t1 and t2, at each (consecutive) ignition event, the laser intensity may be step-wise decreased until the monitored cylinder flame quality is degraded over a threshold number of consecutive ignition events. The step-wise decrease may be based on the engine load (plot 308). In the depicted example, the cylinder flame quality may be determined based on an inferred peak in-cylinder temperature. The temperature may be based on the output of a photodetector coupled to the laser ignition device, the photodetector operating in an infra-red spectrum.

During the ignition event immediately before t2, as the ignition intensity is decreased, cylinder flame quality may become degraded and fall below threshold 307. The controller may then infer that the laser intensity is too low and in response to the degraded flame quality, the laser intensity may be increased at t2. The increase may also be step-wise but may be smaller than the preceding step-wise decrease. In response to the increase in laser intensity, the flame quality may improve.

Between t2 and t3, the laser intensity may be further optimized by reiterating the dynamic adjustment of the laser intensity. Specifically, between t2 and t3, the laser intensity may be step-wise decreased with the size of the step-wise decrease adjusted to be smaller than the size of the step-wise decrease performed between t1 and t2. In addition to being shallower, the steps may also be longer. In other words, the laser intensity may be decreased by a smaller amount and then held at the reduced intensity for a number of ignition events (e.g., 1-2 events) before the intensity is decreased again.

At t3, a misfire event may be indicated. In response to the misfire indication, the laser intensity may be increased and held at the increased level until the indication of misfire is reduced at t4. At t4, it may be determined that the engine load is increasing. To provide sufficient ignition energy to provide good combustion during the elevated engine load conditions, at t4, the laser intensity may be increased. The laser intensity may then resume the dynamic adjustment with the intensity step-wise decreased between t4 and t5. Herein, a size of the steps used to decrease the intensity may be smaller than the size of the steps used to decrease the intensity between t1 and t2, when the engine load was lower. At t5, the engine load may decrease and the dynamic adjustment of the laser intensity with the larger steps may be resumed. In this way, laser energy usage can be optimized.

In one example, a hybrid vehicle system comprises an engine including a cylinder, the cylinder including a piston, an electric motor-generator couple to a battery, a battery-operated laser ignition device coupled to a cylinder head, and a photodetector configured for infra-red detection coupled to the laser ignition device. A vehicle controller may be configured with computer readable instructions for: at each ignition event, estimating a flame quality inside the cylinder using the photodetector, and in response to the estimated flame quality being higher than a threshold, reducing a laser intensity of the laser ignition device at a subsequent ignition event. Further, in response to the estimated flame quality being lower than the threshold, the controller may increase the laser intensity of the laser ignition device for a threshold number of ignition events. As used herein, reducing a laser intensity of the laser ignition device includes drawing a smaller current from the battery into the laser ignition device, while increasing the laser intensity of the laser ignition device includes drawing a larger current from the battery into the laser ignition device.

In this way, laser energy usage can be fine-tuned to reduce energy consumption and improve hybrid vehicle fuel economy. By reducing the laser intensity for an ignition event towards a minimal level without degrading combustion parameters such as flame quality, laser energy usage is reduced. By close-loop adjusting the laser intensity based on the flame quality, rather than open-loop adjusting the laser intensity, the need to provide excess laser energy to guarantee flame quality is reduced. This reduces consumption of battery power during laser actuation and improves fuel economy in a hybrid vehicle system.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:

dynamically adjusting a laser intensity of an engine laser ignition device during a cylinder ignition event via closed-loop control based on a monitored cylinder flame quality, increasing an amount of current drawn from a battery of an engine into the laser ignition device to increase the laser intensity, and decreasing the amount of current drawn from the battery of the engine into the laser ignition device to decrease the laser intensity.

2. The method of claim 1, wherein the dynamically adjusting includes, at each ignition event, decreasing the laser intensity until the monitored cylinder flame quality is degraded over a threshold number of consecutive ignition events, and then increasing the laser intensity.

3. The method of claim 2, wherein decreasing the laser intensity includes step-wise decreasing the laser intensity over each ignition event with a first factor based on engine load.

4. The method of claim 3, wherein increasing the laser intensity includes step-wise increasing the laser intensity over each ignition event with a second factor based on engine load.

5. The method of claim 4, wherein the first factor applied during the decreasing is larger than the second factor applied during the increasing.

6. The method of claim 5, further comprising, after increasing the laser intensity, reducing the first factor and repeating the decreasing the laser intensity until the monitored cylinder flame quality is degraded with the reduced first factor.

7. The method of claim 5, further comprising, in response to a rate of increase in engine load being larger than a threshold, increasing the second factor or decreasing the first factor.

8. The method of claim 2, wherein decreasing the laser intensity includes decreasing the current drawn into the laser ignition device during each ignition event, and wherein increasing the laser intensity includes increasing the current drawn into the laser ignition device during each ignition event.

9. The method of claim 1, further comprising, monitoring the cylinder flame quality via a photodetector coupled to the laser ignition device, the monitoring including inferring a peak in-cylinder temperature following each ignition event based on an output of the photodetector.

10. The method of claim 9, wherein monitoring the cylinder flame quality with the photodetector includes monitoring the cylinder flame quality with a photodetector that includes one or more of an infrared camera, a CCD camera, and a spectral sensor.

11. The method of claim 9, wherein the monitored cylinder flame quality being degraded includes the inferred peak in-cylinder temperature being lower than a threshold.

12. A method for a hybrid vehicle engine including a laser ignition system, comprising:

following a laser ignition event of the engine, reducing a laser intensity at a plurality of subsequent laser ignition events of the engine until an inferred combustion flame quality reaches a threshold, the inferred combustion flame quality based on a photodetector coupled to the laser ignition system; and then increasing the laser intensity responsive to reaching the threshold, wherein the photodetector is configured for infra-red detection and wherein the inferred combustion flame quality based on the photodetector includes estimating a peak in-cylinder temperature following each laser ignition event based on an output of the photodetector and the inferred combustion flame quality is degraded when the estimated peak in-cylinder temperature is lower than a threshold.

13. The method of claim 12, wherein reducing the laser intensity includes reducing a current delivered to the laser ignition system from a battery by a first factor, the reduction factor based at least on engine load.

14. The method of claim 13, wherein the first factor is further based on one or more of a cylinder head temperature, an exhaust air-fuel ratio, and a state of charge of the battery.

15. The method of claim 13, wherein increasing the laser intensity includes increasing the current delivered to the laser ignition system by a second factor, the second factor based on the first factor and a rate of change in engine load.

16. The method of claim 15, wherein the second factor is increased as a rate of rise in engine load increases.

17. The method of claim 16, wherein the first factor is decreased and/or the second factor is increased in response to one or more of an engine misfire event and a pre-ignition event.

18. A hybrid vehicle system, comprising:

an engine including a cylinder, the cylinder including a piston;

an electric motor-generator coupled to a battery;

a battery-operated laser ignition device coupled to a cylinder head;

a photodetector configured for infra-red detection coupled to the laser ignition device; and a controller with computer readable instructions for:

at each ignition event, estimating a flame quality inside the cylinder using the photodetector;

in response to the estimated flame quality being higher than a threshold, reducing a laser intensity of the laser ignition device at a subsequent ignition event; and in response to the estimated flame quality being lower than the threshold, increasing the laser intensity of the laser ignition device for a threshold number of ignition events, wherein reducing the laser intensity of the laser ignition device includes drawing a smaller current from the battery into the laser ignition device, and wherein increasing the laser intensity of the laser ignition device includes drawing a larger current from the battery into the laser ignition device.

* * * * *